(12) United States Patent
Lohr

(10) Patent No.: US 8,772,985 B2
(45) Date of Patent: *Jul. 8, 2014

(54) SELF-DIAGNOSING TRANSMISSION SYSTEM

(75) Inventor: Georg Lohr, Eichenau (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 318 days.

This patent is subject to a terminal disclaimer.

(21) Appl. No.: 13/219,428

(22) Filed: Aug. 26, 2011

(65) Prior Publication Data

US 2011/0309943 A1    Dec. 22, 2011

Related U.S. Application Data

(63) Continuation of application No. 10/312,525, filed as application No. PCT/DE01/02443 on Jul. 2, 2001, now Pat. No. 8,013,468.

(30) Foreign Application Priority Data

Jun. 30, 2000    (DE) .................................. 100 31 005

(51) Int. Cl.
  *H02P 9/00* (2006.01)
(52) U.S. Cl.
  USPC ........................................................ 307/153
(58) Field of Classification Search
  USPC ........................................................ 307/153
  See application file for complete search history.

(56) References Cited

U.S. PATENT DOCUMENTS

| | | |
|---|---|---|
| 3,852,665 A | 12/1974 | Bothner |
| 4,779,490 A | 10/1988 | Milunas et al. ............... 477/115 |
| 5,079,759 A | 1/1992 | Kajiyama ..................... 370/245 |
| 5,177,419 A | 1/1993 | Pickering et al. |
| 5,523,959 A * | 6/1996 | Seegmiller .................... 702/130 |
| 5,868,646 A | 2/1999 | Spichalsky ..................... 477/97 |
| 6,011,962 A | 1/2000 | Lindenmeier et al. |
| 6,055,469 A | 4/2000 | Shoji et al. ..................... 701/34 |
| 2004/0029531 A1 | 2/2004 | Lohr |

FOREIGN PATENT DOCUMENTS

| | | |
|---|---|---|
| DE | 2207525 A1 | 10/1973 |
| DE | 196 19 728 A1 | 11/1997 |
| DE | 19618833 A1 | 11/1997 |
| DE | 19619728 A1 | 11/1997 |
| DE | 100 31 005 A1 | 1/2002 |
| EP | 0 920 092 A2 | 6/1999 |
| EP | 0920092 A2 | 6/1999 |
| WO | WO 02/03403 A2 | 1/2002 |

OTHER PUBLICATIONS

English Abstract for German publication No. DE 101 93 304 (One (1) page).
English Abstract for European publication No. EP 1 299 929 (Two (2) pages).

* cited by examiner

*Primary Examiner* — Rexford Barnie
*Assistant Examiner* — Dru Parries
(74) *Attorney, Agent, or Firm* — Crowell & Moring LLP

(57) ABSTRACT

A system transmits electric signals, electric energy or media over short distances between units movable relative to each other. The system has at least one first unit disposed along the trajectory of the movement and at least one second unit disposed for movement relative to the first unit. A diagnosis unit is associated with at least one of the units to detect the condition of at least one of said movable units and signals that detected condition to a central control unit.

14 Claims, 1 Drawing Sheet

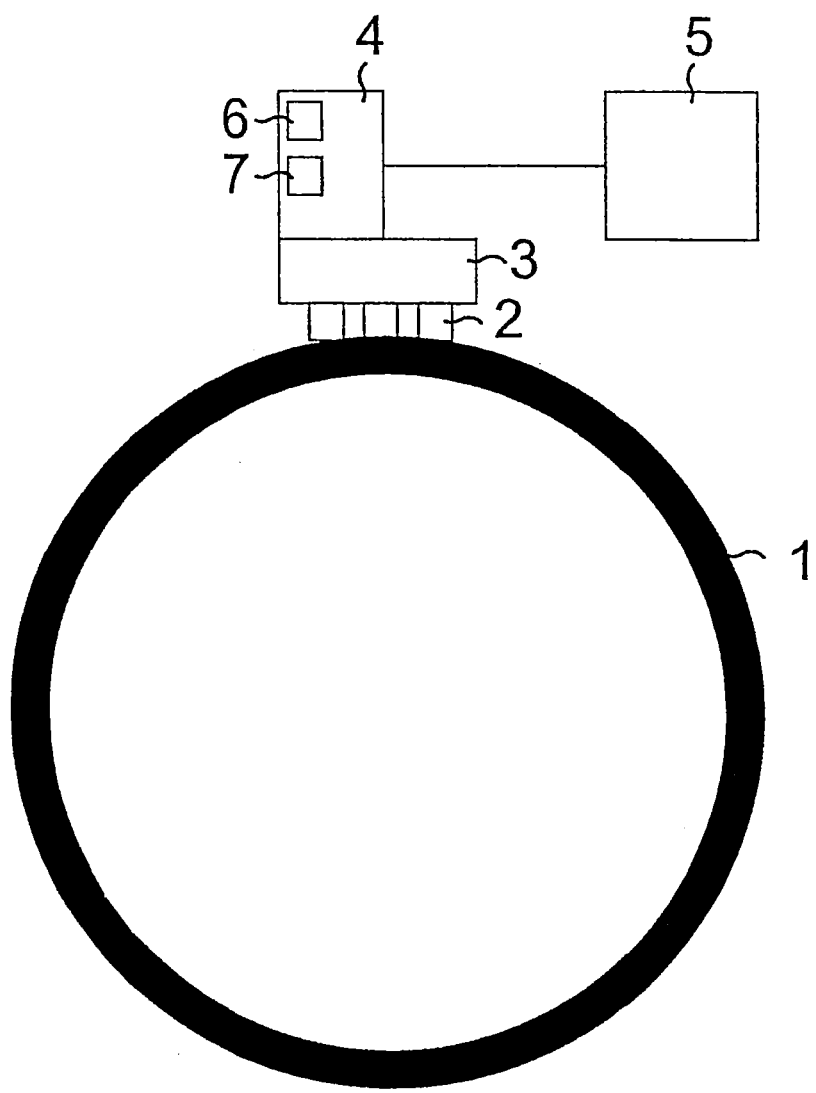

SELF-DIAGNOSING TRANSMISSION SYSTEM

This application is a continuation of application Ser. No. 10/312,525 which is the National Stage of International Application No. PCT/DE01/02443, filed Jul. 2, 2001, the disclosures of which are incorporated by reference herein.

BACKGROUND OF THE INVENTION

The present invention relates to systems for transmitting electric signals, electric power, liquids, gases and other media over short distances between units movable relative to each other. Depending on the type of the movement, these are encompassed by various terms such as contact lines, slip rings or generally rotary transmission systems.

So-called contact lines are used to transmit electric signals or electric power with a preferably linear or slightly curved trajectory. In the event of rotary movements, these elements are referred to as slip rings. For non-contacting transmission between mated parts or units movable relative to each other, various systems are known, for example the system described in the European Patent Application 98 907 894.4-2206 and comprising a conductor-like structure composed of discrete dummy elements. Moreover, so-called rotary transmitters are known for liquids and gases, particularly in the event of transmission between mated parts or units rotating relative to each other. As a rule, such transmission systems are highly important for the function of the overall system. They are often even classified as critical components. If, for example, the signaling function would fail between the rotor and the stator in a computer tomograph, the emitter performance of the X-ray tube could no longer be controlled. As a consequence, the patient could be exposed to an excessive radiation dose. In the case of a crane installation movable along a linear path, the failure of the emergency stop device could lead to catastrophic consequences. It is therefore definitely necessary in all of these applications to monitor the transmission path. This is frequently achieved by monitoring the data communication between the transmitter and the receiver, with a great number of different components being often integrated into this data path in its entirety. The overall system of the transmission path is hence monitored. This known concept, however, entails the disadvantage that individual failed or faulty components cannot be located. This disadvantage is substantially more serious when the fault modes of isolated transmission components are considered. When mechanical sliding contact arrays, especially slip rings, are used for signal transmission, various fault constellations may occur. When, in the simplest case, the sliding path is soiled, for instance, this may result in sporadic failure events. Such faults can often still be absorbed by a system fault correction function. As soon as the first sporadic transmission faults occur, it is possible in such a case to clean the system again and to repair it. When the carbon or graphite brushes are worn to a maximum extent, however, massive faults occur in transmission suddenly because the brushes lift off the sliding path and can no longer establish a contact. Here, a pre-signaling period from the first failure up to total breakdown is comparatively short. The effects are substantially more serious in non-contacting transmission paths. When, for example, the transmitter output power decreases continuously, due to electronic components aging, it is possible that one day the signal amplitude will drop below the input response threshold of the receiver and that data transmission is no longer possible. This may result in an abrupt system breakdown without pre-signaling interval. In the case of liquid transmitters, the leakage of slight quantities of liquid is sufficient to result in serious damage to neighboring electronic components or other parts.

In the description below, no distinction is made between stationary and movable because such a distinction is only a question of the definition of the reference system.

SUMMARY OF THE INVENTION

The present invention is therefore based on the problem of providing a system that is capable of diagnosing its own condition in a simple and low-cost manner.

In accordance with the present invention, a diagnosis unit is associated with the movable units, which unit is capable of determining critical parameters of the transmission unit and of communicating these parameters further to a central analyzer unit. What is essential for the proper functioning of the diagnosis system is the aspect that is determines parameters relevant for the quality in transmission directly at the site of the transmission system. For example, it is possible to perform one global measuring of the noise for assessing a complete transmission system consisting of one or several transmitter units, feed lines or connecting elements, respectively. When the noise increases beyond a threshold value, it is possible merely to establish that this threshold is exceeded but the origin of the noise cannot be located or localized. However, a diagnosis unit associated directly with the transmitter unit is suitable to solve specifically this problem. The same is true with regard to liquid transmission systems or other media transmission systems, for example, where a drop in pressure is to be diagnosed.

According to a particularly expedient embodiment of the invention, a diagnosis unit is associated with at least one of the components of the electric transmission system in the event that an electric transmission system is provided. As a result, the electric transmission system can be diagnosed directly at the site of the transmitter.

Another expedient embodiment of the invention provides, in the event of a sliding contact array, a diagnosis unit is associated with the unit including the mobile sliding contacts. This unit of the mobile sliding contact, which is frequently referred to as support of the contact springs, as a carbon brush mount or even as a brush block, supports the contact springs, the graphite or carbon contact elements or other contact materials. By contrast to the other contact component, i.e., the sliding path, the stronger wear mostly occurs here. For this reason, a diagnosis unit should preferably be associated at that location.

In another expedient embodiment of the invention, a diagnosis unit is preferably associated with the receiver in the case of an active transmission means. In the event of active systems which employ electronic components for signal transmission, the receiver is the most critical component because in such a case the lowest signal levels occur with interference that can mostly not be neglected. Specifically, a diagnosis unit capable of still evaluating the signal-to-noise ratio optionally is particularly important. An optional diagnosis unit is capable of diagnosing the signal levels in the transmitter.

According to a further advantageous embodiment of the invention, several diagnosis units are interconnected by a common bus system. With this provision, a particularly simple architecture of the installation is possible, particularly in rather large-size systems. Apart therefrom, a simple extension of existing systems is possible merely by the addition of further transmitter units with diagnosis units. Examples of preferred bus systems appearing to be particularly appropriate are CAN systems, Profibus, Interbus or other field bus systems.

In another expedient embodiment of the invention, transmitter units are provided between the movable units for transmitting the signals of the bus system so that an analyzer unit is required only on one side of the transmission system. In the case of a mechanical slip ring, for example, slip ring paths are provided for the transmission of the bus signals between the mobile units. Likewise, the signals may also be transmitted, for example, via a multiplexer system in addition to other information that is to be transmitted. When the transmitter unit includes a high-speed bus system, this bus system may also be used to transmit the signals between the movable units in a time-based multiplexing method.

According to a further expedient embodiment of the invention, at least one diagnosis unit comprises at least a microprocessor or a micro controller. The micro controller serves the purpose of evaluating the sensor signals or to signal measured values or signaling information to other units, respectively.

In another advantageous embodiment of the invention, optionally a display means is provided on the diagnosis unit to display the condition of the transmitter preferably in an optical or acoustical manner, respectively. In a currently preferred case, the status of the transmission system can be established directly on the diagnosis unit. Hence, an additional display unit or an additional diagnosis system, respectively, is required. For instance, signaling can be performed by audible alarms, by a signaling tone or a succession of sounds, or even in the output of plain language, and optionally also by an optical alarm such as lamps or light-emitting diodes or even by the output of a text.

According to a further expedient embodiment, at least one diagnosis unit comprises a display to optionally display critical operating parameters, in particular, such as the period of operation, the period of operation still remaining, the maintenance interval or, in the case of transmission with slip contacts, the extent of wear or the contact material still left. Hence, the appropriate user or the servicing engineer has immediate access to the relevant parameters of the transmission system. Optionally, further additional information may be provided as to the maintenance intervals or components to be exchanged.

Another embodiment of the invention provides for monitoring preferably critical electric parameters such as signal amplitude, signal-to-noise ratio, signal shape or even an eye pattern in the case of contacting electrical transmission. Specifically, the measurement or monitoring of these electric parameters permits the assessment of the fundamental functional integrity of the transmission system. For example, the magnitude of the contact noise furnishes a summary value denoting the quality of the transmission system. This is certainly an informative parameter for ensuring that electric signals are to be transmitted to the transmission system, as the contact noise has a substantial influence on the transmission quality.

A further embodiment of the invention provides for monitoring preferably critical mechanical parameters such as signal amplitude, signal-to-noise ratio, signal development or even eye patterns.

According to yet another embodiment of the invention, critical mechanical parameters such as the condition of the contacts or the length of the carbon brushes and physical parameters are monitored in the case of a contacting electrical transmission. A number of physical parameters have a substantial influence on the transmission quality, particularly in the components directly involved in the signal transmission. A particularly good example of this is the length of the carbon contacts in a mechanical slip ring. With a long carbon length, the carbon pressing spring is strongly compressed so that a high pressing force is achieved as well, which results in comparatively low contact noise. As wear progresses, the pressing force is reduced, with contact noise exhibiting a continuous slight increase. When the carbon is now ground far beyond its wear limit, the transmission is stopped from a certain point onwards. In such a case, the inventive diagnosis system is hence envisaged for monitoring the length of the carbon and to signal an imminent requirement to exchange the carbon in due time, before transmission fails. The monitoring of the mechanical parameters completes the previously described monitoring of the electric parameters. For example, it is possible to detect on the basis of the measurement of the contact noise that the transmission system no longer satisfies the requirements. The measurement of the physical parameters such as the length of the carbon elements also permits the detection of the cause of such a behavior when, for instance, the carbon element is already ground off excessively.

According to still another embodiment of the invention, optionally relevant mechanical or physical parameters are detected. Example of such parameters may be true running or concentricity, axial eccentricity or also the distance or the track guidance of the mobile units. Specifically, such mechanical or physical parameters have a serious influence on the function, in both contacting and non-contacting data transmission installations and particularly in media transmission installations. For example, in contacting slip rings exhibiting a high number of revolutions, variations in height or level in an order of 0.1 mm may cause such a strong contact noise that these elements can hardly be used for signal transmission. According to the present invention, the diagnosis unit is hence equipped with sensors and appropriate analyzer circuits or algorithms to permit the detection of such variations with sensors and appropriate analyzer circuits or algorithms, respectively, which permit the detection of such variations. For example, a change in level or position can be expediently detected with an inductive approach sensor.

Another embodiment provides for a diagnosis unit that is so designed that it monitors the communication between external signal sources or sinks communicating with each other by way of the transmission unit and the associated transmission unit. Thus, not only the transmitter unit as such is monitored, but additionally the communication path from or to an external signal source or signal sink, respectively, and optionally this source as such, is integrated into the monitoring function. Such a monitoring function may be implemented, for example, by the provision that the signals received in the transmitter unit are already checked. Such signal check may encompass, for instance, signal amplitude, line impedance, spectral composition, eye patterns, or other electric parameters, respectively. This permits an even more detailed analysis of failure or potential failure sources.

According to a further expedient embodiment of the invention, at least one diagnosis unit comprises an analyzer unit that is capable of performing specific statistic analyses or trend analyses, respectively. The measured values are often not informative alone. For example, the contact noise of a mechanical slip ring unit may strongly vary. In such a case, a statistical analysis may be made to gain a substantially better insight into the behavior of the transmission system. For example, a value reflecting the probability of occurrence of contact resistance values could be referred to as a yardstick for the assessment of the quality of the transmission system. Another important analysis method is trend analysis. This approach permits the estimation of the future development of the properties and characteristics of a transmission system, and of whether or when measures must be taken or maintenance must be carried out.

BRIEF DESCRIPTION OF THE DRAWING

The invention will be described in the following by exemplary embodiments, without any restriction of the general inventive idea and with reference to the drawing which is referred to in all other respects as far as the disclosure of all inventive particulars is concerned that are not explained in more details in the text.

The sole FIGURE shows an exemplary embodiment of a system in accordance with the present invention, which in this case is a mechanical slip ring system.

DETAILED DESCRIPTION OF THE DRAWING

A mechanical slip ring transmitter consists of a rotor 1 and a carbon or graphite brush mount 3 with associated carbon or graphite elements 2 for signal sampling. A diagnosis unit 4 is associated with the graphite or carbon brush mount 3 or the brush block, respectively, which detects the condition of the carbon elements 2 and communicates signals representative of that condition to a central control unit 5. Moreover, the diagnosis unit is provided with a visual display device 6 as well as a device 7 for audible signaling of the carbon element condition.

The invention claimed is:

1. A mechanical slip ring system, comprising:
 a mechanical slip ring transmitter including:
  a rotor; and
  a brush mount including brushes, wherein the brushes are in contact with the rotor; and
 a diagnosis unit associated with at least one of the rotor and the brush mount for monitoring at least one of the electrical parameters of signal amplitude, signal-to-noise ratio, signal shape, or eye pattern for assessment of a fundamental functional integrity of the mechanical slip ring system.

2. The mechanical slip ring system according to claim 1, further comprising a central control unit coupled to the diagnosis unit.

3. The mechanical slip ring system according to claim 1, further comprising a common bus system and wherein the diagnosis unit is coupled to the common bus system.

4. The mechanical slip ring system according to claim 1, wherein the diagnosis unit includes a visual display and/or an audible signaling device.

5. A mechanical slip ring system, comprising:
 a mechanical slip ring transmitter including:
  a rotor; and
  a brush mount including brushes, wherein the brushes are in contact with the rotor; and
 external signal sources or sinks communicating with each other by means of said mechanical slip ring transmitter;
 wherein a diagnosis unit is associated with at least one of the rotor and the brush mount for monitoring the communication of said external signal sources or sinks for assessment of a fundamental functional integrity of the mechanical slip ring system.

6. The mechanical slip ring system according to claim 5, further comprising a central control unit coupled to the diagnosis unit.

7. The mechanical slip ring system according to claim 5, further comprising a common bus system and wherein the diagnosis unit is coupled to the common bus system.

8. The mechanical slip ring system according to claim 5, wherein the diagnosis unit includes a visual display and/or an audible signaling device.

9. A mechanical slip ring system, comprising:
 a mechanical slip ring transmitter including:
  a rotor; and
  a brush mount including brushes, wherein the brushes are in contact with the rotor; and
 a diagnosis unit associated with at least one of the rotor and the brush mount for monitoring at least one of the electrical parameters of signal amplitude, signal-to-noise ratio, signal shape, or eye pattern for assessment of a fundamental functional integrity of the mechanical slip ring system, the diagnosis unit further comprises an analyzer unit that is capable of performing specific statistical analyses or trend analyses of the monitored data.

10. The mechanical slip ring system according to claim 9, further comprising a central control unit coupled to the diagnosis unit.

11. The mechanical slip ring system according to claim 9, further comprising a common bus system and wherein the diagnosis unit is coupled to the common bus system.

12. The mechanical slip ring system according to claim 9, wherein the diagnosis unit includes a visual display and/or an audible signaling device.

13. A rotary electric transmission system, comprising:
 an electric transmission unit including:
  a first component; and
  a second component;
  wherein external signal sources or sinks are communicating with each other by means of said electric transmission unit;
 an electric signal or an electric power is transmitted between the first component and the second component and wherein the first component is movable relative to the second component; and
 a diagnosis unit associated with at least one of the rotor and the brush mount for monitoring the communication of said external signal sources or sinks for assessment of a fundamental functional integrity of the rotary electric transmission system.

14. A rotary electric transmission system, comprising:
 an electric transmission unit including:
  a first component; and
  a second component;
  wherein an electric signal or an electric power is transmitted between the first component and the second component and wherein the first component is movable relative to the second component; and
 a diagnosis unit associated with at least one of the first component and the second component of the electric transmission unit, wherein the diagnosis unit determines a quality of the electric signal or the electric power transmitted between the first component and the second component of the electric transmission unit for assessment of a fundamental functional integrity of the rotary electric transmission system;
 wherein the diagnosis unit further comprises an analyzer unit that is capable of performing specific statistical analyses or trend analyses of the monitored data.

\* \* \* \* \*